United States Patent [19]

Lupfer

[11] 4,114,120
[45] Sep. 12, 1978

[54] STRIPLINE CAPACITOR

[75] Inventor: David A. Lupfer, Metuchen, N.J.

[73] Assignee: Dielectric Laboratories, Inc., Cazenovia, N.Y.

[21] Appl. No.: 744,237

[22] Filed: Nov. 23, 1976

[51] Int. Cl.² ............... H01P 3/00; H01G 1/005; H01G 1/14
[52] U.S. Cl. .................. 333/84 M; 361/303; 361/306; 361/320
[58] Field of Search ............ 333/84 M; 361/275, 303, 361/306, 308, 320, 321

[56] References Cited

U.S. PATENT DOCUMENTS

| | | | |
|---|---|---|---|
| 3,582,833 | 6/1971 | Kordos | 333/84 M |
| 3,786,375 | 1/1974 | Sato et al. | 333/84 M |
| 3,825,805 | 7/1974 | Belohoubeck | 333/84 M |
| 4,004,200 | 1/1977 | Johanson | 361/320 |

*Primary Examiner*—Alfred E. Smith
*Assistant Examiner*—Harry Barlow
*Attorney, Agent, or Firm*—Kenyon & Kenyon, Reilly, Carr & Chapin

[57] ABSTRACT

An improved capacitor for use in stripline applications which consists of a dielectric material which is plane parallel and has on its two surfaces electrodes forming plates thereof with the width of the dielectric material and the electrodes selected to match the width of the stripline to which the capacitor is to be attached thereby minimizing disturbances and discontinuities in the stripline circuit.

21 Claims, 15 Drawing Figures

STRIPLINE CAPACITOR

BACKGROUND OF THE INVENTION

This invention relates to capacitors in general and more particularly to an improved capacitor for use with stripline circuit layouts.

Striplines are finding wide use in microwave circuits. With such stripline circuits, the circuit designer has basically one parameter to control the impedance and propagation characteristics for the circuit line. Once the dielectric constant and thickness of the mounting board for the striplines are determined and specified and it has been provided with a proper surface finish to minimize discontinuity in the conductor pattern, then, the width of the conductor pattern which makes the stripline controls the electrical characteristics, particularly the characteristic impedance. The line width may be varied depending on the major frequencies which are to be deployed upon it in order to reduce propagation losses for a particular use. The width used may be, for example, 0.050 inches, 0.045 inches, 0.030 inches, 0.025 inches, 0.020 inches and other suitable widths for a particular design.

In many circuits it is necessary to interrupt the stripline and insert a capacitor for d.c. blocking purposes. Such may occur where in the circuit design it is desired to have one side of the circuit at one d.c. potential and another side at another d.c. potential. In many cases blocking must be done to isolate circuit sections to add energy in the form of d.c. potentials. In other cases, it is desired to have capacitive coupling from one line to another, for phase shifting or other methods of coupling. Again, in such cases, one line is connected to the other by means of a capacitor. Bypassing is done in other cases to remove spurious or unwanted signals.

In microwave circuits of this nature, it has not been possible with known devices to insert capacitors either for d.c. blocking purposes or for bypassing or coupling without concomitant loss to the circuit. The capacitors protrude upward from the boards and stripline. In other cases they have sizes different from the striplines or have electrodes which are not parallel to the striplines. Others have weak or inductive connections or other similar problems.

Thus, the need for an improved capacitor structure for use with stripline circuits becomes evident.

SUMMARY OF THE INVENTION

The present invention provides such a capacitor. The capacitor of the present invention comprises essentially a plane parallel two-electrode capacitor with electrodes only on the major faces of the dielectric material. The only electrodes are the plane parallel conductors. In the preferred embodiment of the present invention one dimension, hereinafter referred to as the width, is the same or nearly the same as the width of the stripline. As described in detail, one electrode is securely attached to one element of the stripline. As a result, the conductors become coincident and there is little or no discontinuity in that section of the stripline. The other electrode, in accordance with the preferred embodiment, has a beam shaped lead attached, this lead again being of the same or nearly the same width as the adjacent portion of the stripline. The beam lead is then brought down and connected with another line. Once again, discontinuities are avoided and a minimum inductance and resistance path is provided. The use of a beam lead provides the lowest resistance path possible. To obtain the desired capacitance while maintaining the width equal or approximately equal to that of the stripline, the length dimension is varied. Control of the dielectric material and its electrical properties is also essential to obtain the desired capacitance. Electrical porcelains and high dielectric constant ceramics are particularly useful in the capacitor of the present invention, particulary where it is to be used in the frequency range of 900 mhz to 30 ghz.

DETAILED DESCRIPTION OF THE PREFERRED EMBODIMENT

Figure 1:
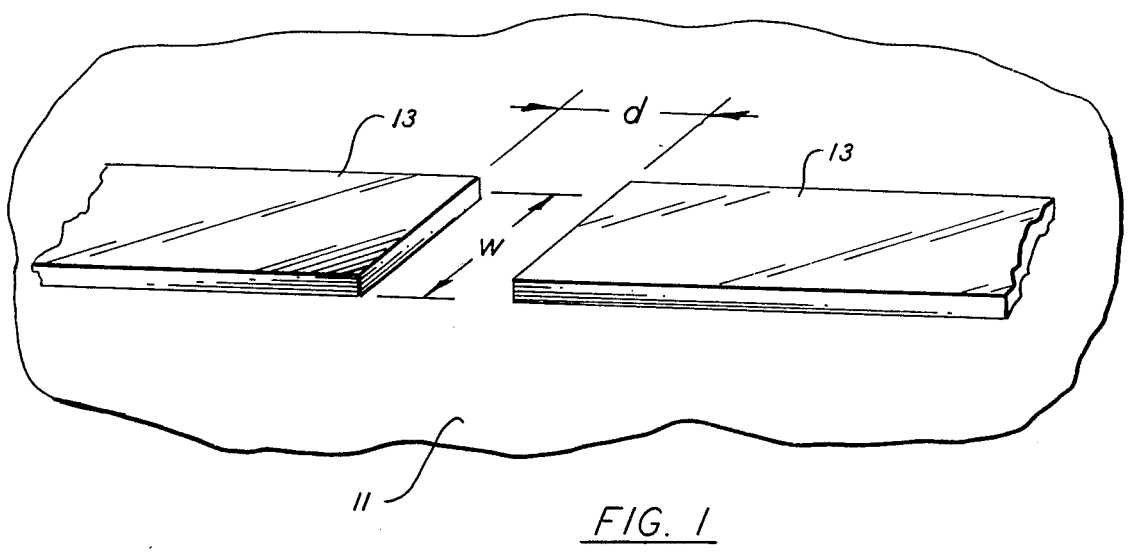
FIG. 1 is a perspective view of a stripline with which the capacitor of the present invention may be used.

FIG. 1 illustrates the basic construction of a stripline with which the present invention may be used. As indicated above, a mounting board 11 is prepared on which are deposited a plurality of conductive strips 13. Shown on FIG. 1 is one of these strips 13 with a discontinuity of spacing "$d$" at which point a capacitor is to be inserted for a d.c. blocking function, tuning function, phase shifting function, or other desired characteristic obtainable only from a capacitor. In accordance with the present invention, it is desired to insert a capacitor therein in such a manner so as to minimize undesirable effects on the circuit.

Figure 2:
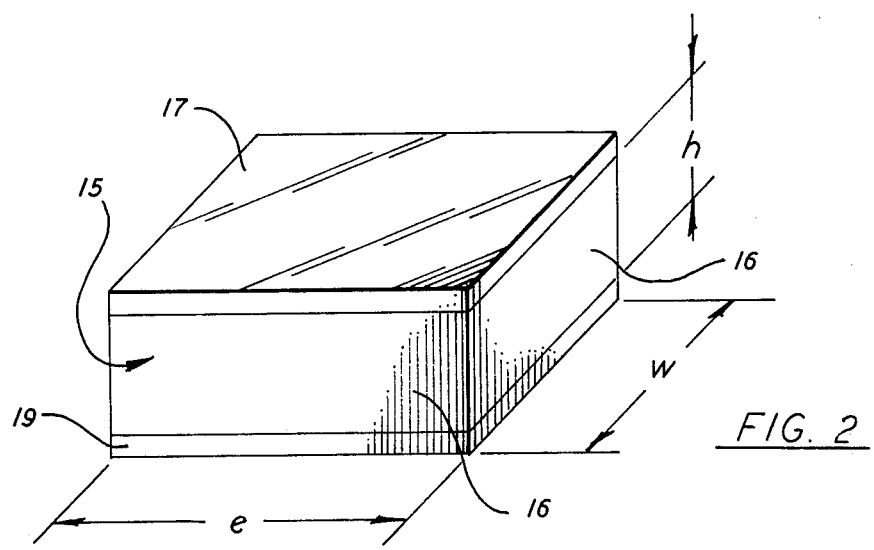
FIG. 2 is a perspective view illustrating the basic structure of the capacitor of the present invention.

The capacitor of the present invention which is used to solve this problem is illustrated on FIG. 2 in a perspective view. The capacitor comprises a dielectric material 15 preferably made of inorganic material, e.g., a ceramic or porcelain structure. The dielectric material 15 is prepared having a desired width $w$ corresponding to the width $w$ of the stripline 13 with which it is to be used. It has polished ceramic faces 15 with no inclusions, chips, or cracks and possesses zero porosity. Bonded to the dielectric 15 are upper and lower electrodes 17 and 19 respectively. Preferably, these are metal barrier layers with gold coatings on their surfaces to aid in bonding and solderability. The length $l$ and thicknesses $h$ of the dielectric are selected along with the dielectric constant of the material 15 to give the desired capacitance in accordance with the basic equation for capacitance which relates capacitance to plate area, separation between plates and dielectric constant. In accordance with the present invention, in designing the capacitor the width $w$ is first selected to be equal or nearly equal to the stripline width and the other parameters then selected to obtain the desired capacitance. With this construction, one obtains low loss, high insulation resistance and high mechanical strength with no roll-back or peeling of the electrodes. With thicknesses between 0.003 inches and 0.050 inches it is possible to obtain capacitances in range from 0.01 pf to 2000 pf.

The length and width can be as small as 0.005 by 0.005 with the size increased to any area required to match a particular stripline and obtain a desired capacitance.

Figure 3:
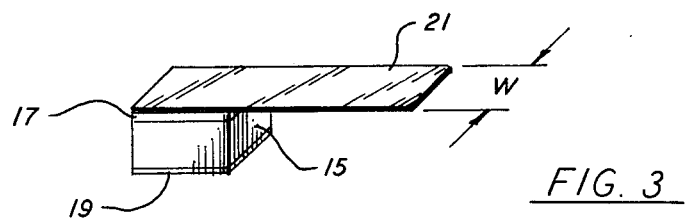
FIG. 3 is a similar view of the capacitor of FIG. 2 with a beam lead attached thereto.

FIG. 3 illustrates a particularly useful embodiment of the present invention. In the embodiment shown thereon, attached to the upper electrode 17 is a beam lead 21. The beam lead 21 particularly when it is to be used in series mounting as will be described below in connection with FIG. 4 has a width w equal or nearly equal to the width of the stripline. By using a beam lead, a solid, secure device is obtained. The beam lead is typically 0.001 to 0.004 inches thick and avoids the use of wire. In other words, one obtains a sturdy device which minimizes discontinuities and disturbances.

Figure 4:
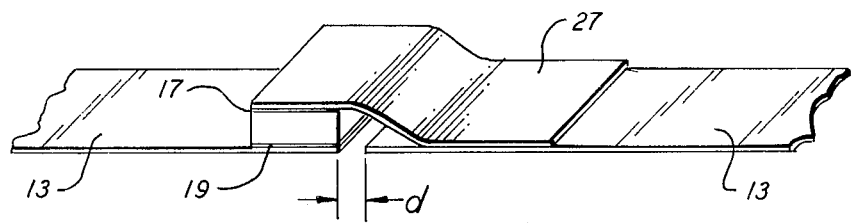
FIG. 4 illustrates the installation of the capacitor of FIG. 3 into a stripline circuit such as that shown on FIG. 1.

FIG. 4 illustrated the capacitor of FIG. 3 coupled into a series arrangement with a stripline 13 such as that of FIG. 1. As illustrated, the bottom electrode 19 of the capacitor is soldered or otherwise connected to the lefthand side of the stripline 13. The beam lead 21 is similarly connected to the stripline 13 on the righthand side. Thus, a capacitor which matches in width the stripline with both its electrodes and with a beam lead is provided thereby minimizing disturbances. It may be seen in FIG. 4 that the stripline gap "d" may be minimized (limited only by voltage consideration) and this will minimize inductive discontinuities.

Figure 5:
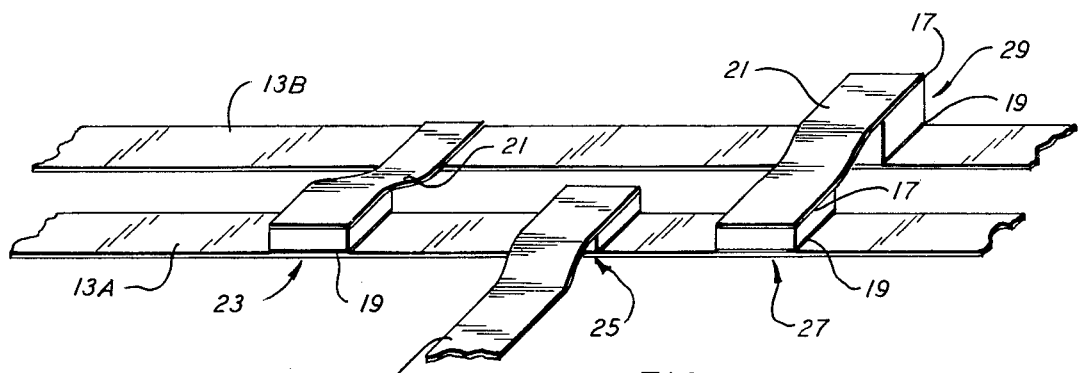
FIG. 5 illustrates the use of capacitors such as those of FIGS. 2 and 3 for coupling between adjacent striplines or between striplines and ground.

FIG. 5 illustrates the use of the capacitor of the present invention for coupling between striplines. Shown are two striplines 13A and 13B. A capacitor 23 has its lower electrode 19 attached to the stripline 13A coupling it therethrough to the stripline 13B which has connected thereto a beam lead 21 of capacitor 23. Also shown is a capacitor 25, again with its lower electrode attached to the stripline 13A. The beam lead 21 of this capacitor can be connected to a ground plane or other stripline. For example, it could be connected to a ground plane for bypassing function. Finally, there are shown two capacitors 27 and 29 having their lower electrodes 19 connected respectively to the striplines 13A and 13B. The upper electrodes of the two capacitors are connected to each other by means of a beam lead 21. Typically, in making such a connection in which the two capacitors are in series, one would use one capacitor such as that shown on FIG. 3 and one such as that shown on FIG. 2. The capacitor of FIG. 3, for example, would be attached to the stripline 13A and the capacitor of FIG. 2 to the stripline 13B. The beam lead of the capacitor 27 would then be attached to the upper electrode 17 of the capacitor 29. When used for coupling between striplines, the width of the beam lead should, of course, equal the length 1 of the capacitor, again minimizing any discontinuities in the circuit.

Figure 6A:
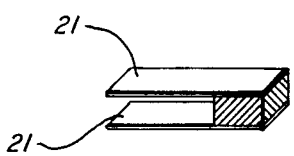
FIGS. 6a-j illustrate various alternate embodiments of the present invention.
Figure 6B:
Figure 6C:
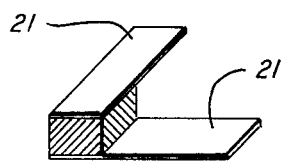
Figure 6D:
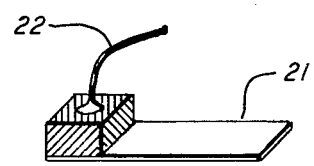
Figure 6E:
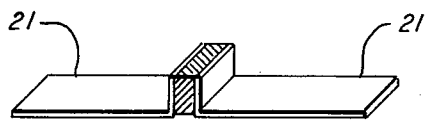
Figure 6F:
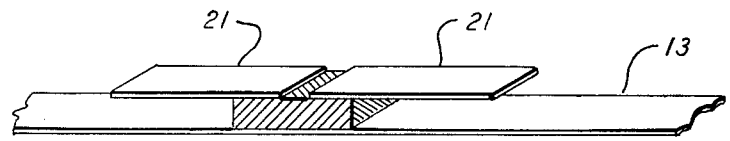
Figure 6G:
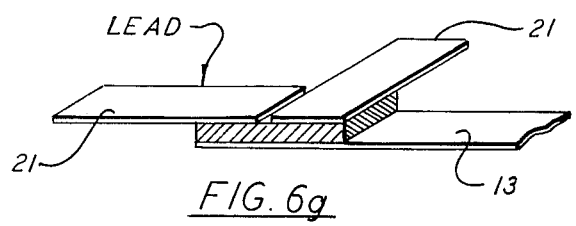
Figure 6H:
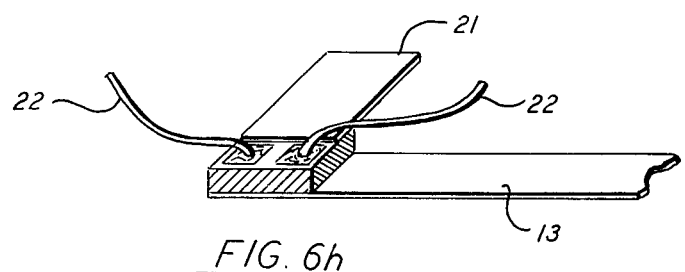
Figure 6I:
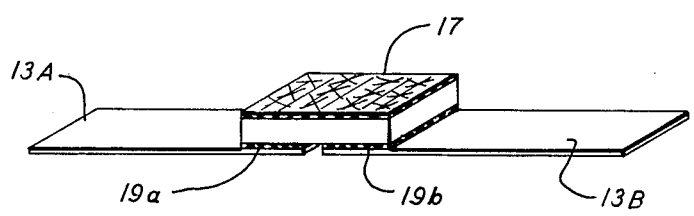

Various other embodiments of the invention are illustrated on FIGS. 6a–j. FIG. 6a illustrates the capacitor of the present invention with two beam leads 21 extending in the same direction. In FIG. 6b the lead 21 extends in opposite directions. FIG. 6c shows an off-angle arrangement of the beam leads. FIG. 6d illustrates the combination of a wire 22 and beam lead 21. FIG. 6e shows a double axial arrangement of the beam leads 21. FIG. 6f illustrates two axial beam leads 21 extending from two sides of a capacitor which is disposed on a stripline 13. FIG. 6g shows a similar arrangement with off-angle leads. FIG. 6h shows a multipattern with one beam lead and two wires on a common face. FIG. 6i shows a special embodiment with spaced electrodes 19a and 19b on the bottom bonded to striplines 13A and 13B. The electrode 17 covers the full face of the top.

Figure 6J:
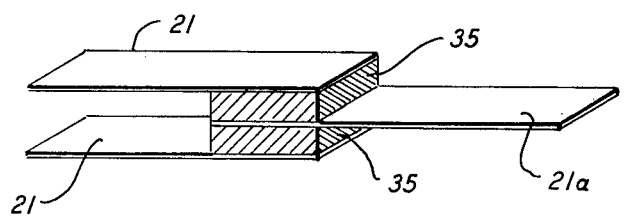

The top electrode has no external connection. In effect, two capacitors in series are formed; one between electrodes 19a and 17 and the others between electrodes 17 and 19b. The capacitors so formed are then in series with the striplines 13A and 13B. Finally, FIG. 6j shows a parallel section unit with two capacitors 35 having one lead 21a in common and each having a separate lead 21 at its opposite face.

Thus, an improved capacitor for use in stripline applications has been shown. Although specific embodiments have been illustrated and described, it will be obvious to those skilled in the art that various modifications may be made without departing from the spirit of the invention which is intended to be limited solely by the appended claims.

I claim:

1. In a stripline circuit having a stripline of width w, an improved capacitor comprising:
   a. a plane parallel dielectric body having upper and lower faces, the width of said dielectric being at least approximately equal to said width w of said stripline;
   b. a first electrode on the lower face of said dielectric, said electrode completely covering said face and thus also having said width w; and
   c. a similar second electrode on the upper surface of said dielectric.

2. The invention according to claim 1 wherein said dielectric is selected from inorganic materials, the group consisting of electrical porcelains, high dielectric constant ceramics, single crystals, and other forms of inorganic dielectrics.

3. The invention according to claim 2 wherein said electrodes comprise a metal barrier with gold outer surface coatings and wherein said electrodes are bonded to said dielectric.

4. The invention according to claim 3 and further including a first beam lead attached to one of said first and second electrodes.

5. The invention according to claim 4 wherein said first beam lead has a width equal to one of the length and width of said electrodes.

6. The invention according to claim 5 wherein said first beam lead has a width equal to the width of said capacitor and extends in the length direction of said capacitor away therefrom whereby said capacitor may be used in series connection in a stripline.

7. The invention according to claim 5 wherein said first beam lead has a width equal to the length of said capacitor and extends in the width direction of said capacitor away therefrom whereby said capacitor may be used for coupling from one stripline to another.

8. The invention according to claim 6 and further including a second beam lead of the same width attached to the other electrode also extending in the length direction.

9. The invention according to claim 8 wherein said second beam lead extends in the same direction as said first beam lead.

10. The invention according to claim 8 wherein said second beam lead extends in the opposite direction.

11. The invention according to claim 7 and further a second beam lead attached to the other electrode extending in a direction perpendicular to said first beam lead.

12. The invention according to claim 9 wherein said first and second beam leads are bent in an L-shape to extend in opposite directions.

13. The invention according to claim 5 and further including a second beam lead attached to said one of said first and second electrodes.

14. The invention according to claim 13 wherein said second beam lead extends in a direction opposite said first beam lead.

15. The invention according to claim 13 wherein said second beam lead extends perpendicular to said first beam lead.

16. The invention according to claim 4 and further including at least one wire attached to one of said electrodes.

17. The invention according to claim 16 wherein said wire is attached to the same electrode as said first beam lead.

18. The invention according to claim 16 wherein said wire is attached to the electrode opposite said first beam lead.

19. The invention according to claim 10 and further including a further capacitor disposed above said capacitor having one electrode attached to said second beam lead and a third beam lead attached to the other electrode of said further capacitor.

20. The invention according to claim 1 wherein said electrodes comprise metal barriers with gold outer surface coatings and wherein said electrodes are bonded to said dielectric.

21. The invention according to claim 1 wherein said width if between 0.005 and 0.200 inches.

* * * * *